(12) United States Patent
Ohga (10) Patent No.: US 7,322,340 B2
(45) Date of Patent: Jan. 29, 2008

(54) ENGINE FUEL INJECTION CONTROL METHOD AND ENGINE FUEL INJECTION CONTROL APPARATUS

(75) Inventor: Kiyoshi Ohga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/602,396

(22) Filed: Nov. 21, 2006

(65) Prior Publication Data
US 2007/0131203 A1 Jun. 14, 2007

(30) Foreign Application Priority Data
Dec. 13, 2005 (JP) ............................ 2005-358684
Sep. 1, 2006 (JP) ............................ 2006-237584

(51) Int. Cl.
*F02M 51/00* (2006.01)
*G06F 17/00* (2006.01)

(52) U.S. Cl. ...................... 123/299; 701/103; 73/119 A (58) Field of Classification Search ................ 123/299, 123/300, 478, 1 A, 406.3; 701/103, 104, 701/105, 108, 111, 112; 73/118.1, 119 A, 73/35.02, 35.06, 35.14
See application file for complete search history.

(56) References Cited

U.S. PATENT DOCUMENTS 6,694,945 B2 * 2/2004 Kawaguchi et al. ........ 123/299
6,748,919 B2 * 6/2004 Abo et al. .................. 123/299
6,880,519 B2 * 4/2005 Nakayama et al. ......... 123/295
7,089,916 B2 * 8/2006 Abo et al. .................. 123/490

FOREIGN PATENT DOCUMENTS

JP 2001-207828 8/2001

* cited by examiner

*Primary Examiner*—Willis R. Wolfe, Jr.
*Assistant Examiner*—Johnny H. Hoang
(74) *Attorney, Agent, or Firm*—Global IP Counselors, LLP (57) ABSTRACT

An engine fuel injection control apparatus has a parameter setting section, a parameter changing section and a determining section. The parameter setting section is configured to set a parameter of fuel injected into an engine to a first injection parameter to control a state of combustion noise or exhaust emission to a target state when an engine operation condition is in a first operation region. The parameter changing section is configured to change the parameter of fuel injected into the engine from the first injection parameter to a second injection parameter when the engine operation condition remains in the first operation region. The determining section is configured to determine whether or not an actual state of the combustion noise or the exhaust emission of the engine changes when the parameter of fuel injected into the engine is changed from the first injection parameter to the second injection parameter.

20 Claims, 6 Drawing Sheets

| MICRO-INJECTION MODE | EFFECT OF MICRO-INJECTION | ENGINE PERFORMANCES CHANGE BEFORE AND AFTER MICRO-INJECTION AMOUNT IS ADJUSTED | SENSOR |
|---|---|---|---|
| PILOT INJECTION | COMBUSTION NOISE REDUCTION | VIBRATION | VIBRATION SENSOR |
| | NO$_x$ CONCENTRATION REDUCTION | ROTATION VARIATION | ROTATION VARIATION SENSOR |
| | | NO$_x$ CONCENTRATION | NO$_x$ CONCENTRATION SENSOR |
| PRE-INJECTION | COMBUSTION NOISE REDUCTION | VIBRATION | VIBRATION SENSOR |
| | NO$_x$ CONCENTRATION REDUCTION | ROTATION VARIATION | ROTATION VARIATION SENSOR |
| | | NO$_x$ CONCENTRATION | NO$_x$ CONCENTRATION SENSOR |
| AFTER-INJECTION | PM CONCENTRATION REDUCTION | PM CONCENTRATION (FILTER PRESSURE LOSS) | DIFFERENTIAL PRESSURE SENSOR |
| | EXHAUST GAS TEMPERATURE DECREASE | EXHAUST GAS TEMPERATURE (FILTER INLET TEMPERATURE) | INLET TEMPERATURE SENSOR |
| POST-INJECTION | FILTER REGENERATION | UNBURNED HC CONCENTRATION (FILTER PRESSURE LOSS) | DIFFERENTIAL PRESSURE SENSOR |

ENGINE FUEL INJECTION CONTROL METHOD AND ENGINE FUEL INJECTION CONTROL APPARATUS

CROSS-REFERENCE TO RELATED APPLICATIONS

This application claims priority to Japanese Patent Application Nos. 2005-358684, filed on Dec. 13, 2006, and 2006-237584, filed on Sep. 1, 2006. The entire disclosures of Japanese Patent Application Nos. 2005-358684 and 2006-237584 are hereby incorporated herein by reference.

BACKGROUND OF THE INVENTION

1. Field of the Invention

The present invention relates to an engine fuel injection control method and an engine fuel injection control apparatus in which a sufficient amount of a micro-injection corresponding to an engine operation condition can be secured even when a fuel injection apparatus of an engine deteriorates over time.

2. Background Information

Japanese Laid-Open Patent Application Publication No. 2001-207828 discloses a conventional engine-fuel injection apparatus configured and arranged to reduce engine combustion noise and exhaust emission by controlling a fuel injection amount.

In view of the above, it will be apparent to those skilled in the art from this disclosure that there exists a need for an improved engine fuel injection control apparatus. This invention addresses this need in the art as well as other needs, which will become apparent to those skilled in the art from this disclosure.

SUMMARY OF THE INVENTION

The conventional engine fuel injection apparatus may not be able to inject a prescribed amount of fuel, which is set corresponding to an engine operation condition, when a fuel injection apparatus deteriorates over time. In this circumstance, the fuel injection amount may be decreased or the fuel injection may not be performed at all. In this case, the engine performances such as the combustion noise and the exhaust emission that are supposed to be improved by controlling the fuel injection amount may deteriorate.

Accordingly, one object of the present invention is to provide an engine fuel injection control method and an engine fuel injection control apparatus which determines time deterioration of the fuel injection apparatus.

In order to achieve the above object of the present invention, an engine fuel injection control apparatus including a parameter setting section, a parameter changing section and a determining section. The parameter setting section is configured to set a parameter of fuel injected into an engine to a first injection parameter to control a state of combustion noise or exhaust emission of the engine to a target state when an engine operation condition is in a first operation region. The parameter changing section is configured to change the parameter of fuel injected into the engine from the first injection parameter to a second injection parameter when the engine operation condition is in the first operation region. The determining section is configured to determine whether or not an actual state of the combustion noise or the exhaust emission of the engine changes when the parameter of fuel injected into the engine is changed from the first injection parameter to the second injection parameter.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
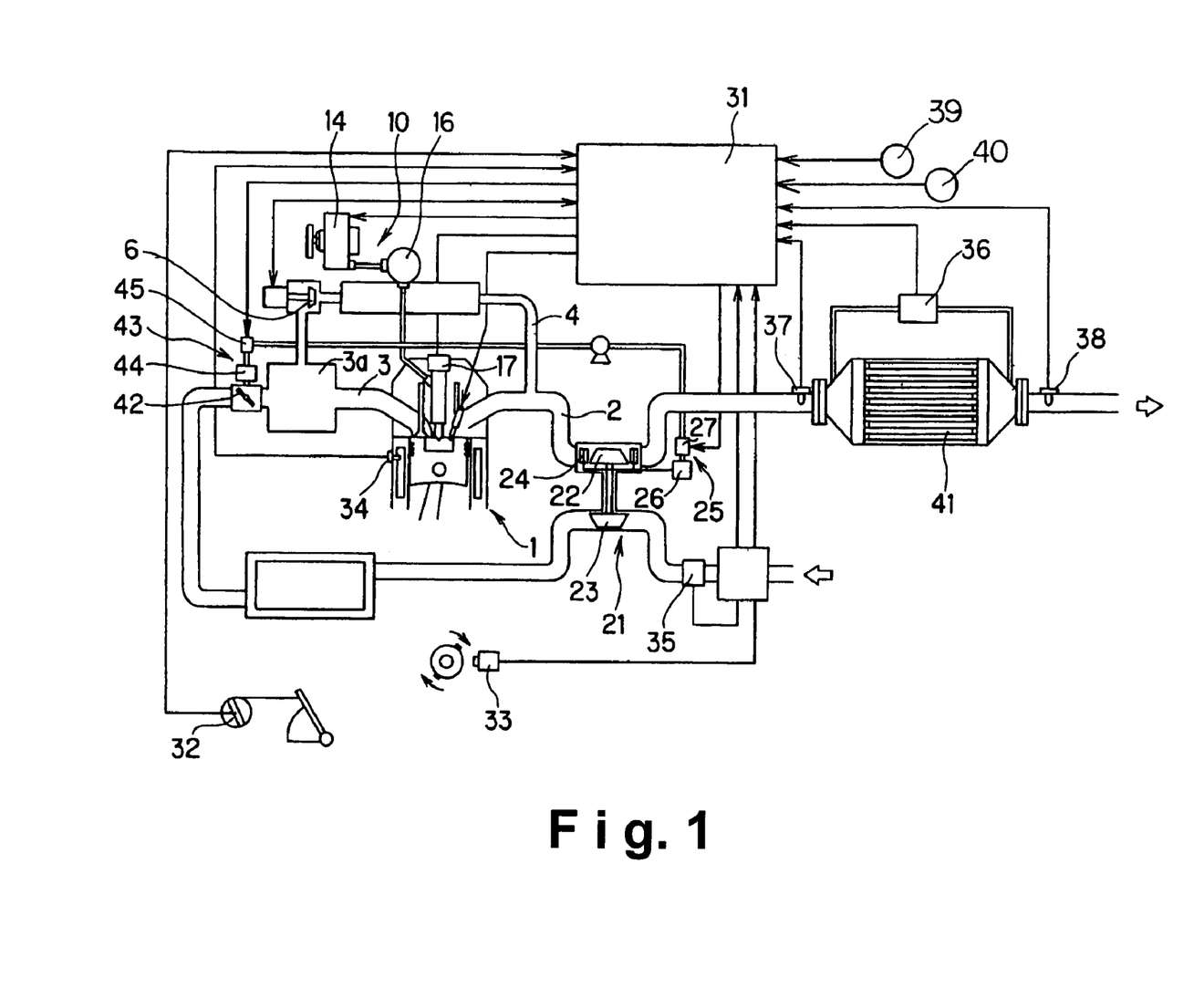
FIG. 1 is an overall schematic diagram of a control system of a vehicle in which an engine fuel injection control apparatus is provided to perform an engine fuel injection control in accordance with one embodiment of the present invention.

Referring initially to FIG. 1, an engine fuel injection control apparatus is illustrated in accordance with one embodiment of the present invention. FIG. 1 is an overall schematic diagram of a control system of a vehicle in which the engine fuel injection control apparatus is applied to perform an engine fuel injection control in accordance with the present invention.

As shown in FIG. 1, the vehicle includes an engine 1, an exhaust passage 2, an intake passage 3, an EGR passage 4, a diaphragm EGR valve 6, a common rail fuel injection device 10, a variable capacity turbocharger 21, and an engine controller 31. The engine 1 is preferably a diesel engine in this illustrated embodiment. The EGR passage 4 connects the exhaust passage 2 and a collector 3a of the intake passage 3 to form a suction-exhaust system of the diesel engine 1. The EGR valve 6 is located in the EGR passage 4. The EGR valve 6 is configured and arranged to operate in response to a control pressure from a pressure control valve (not shown), which is driven by a duty control signal output from the engine controller 31, so that a predetermined EGR rate can be achieved. The predetermined EGR rate is determined based on operation conditions of the engine 1. Alternatively, the EGR valve 6 may be driven by a conventional stepping motor.

The fuel injection device 10 includes a fuel tank (not shown), a low pressure pump (not shown), a high pressure supply pump 14, a common rail (accumulator) 16, and a plurality of injectors 17 (only one injector 17 is shown in FIG. 1) with each injector 17 being provided for each cylinder of the engine 1. The fuel pressurized by the high pressure supply pump 14 is temporarily stored in the common rail 16. The high pressure supply pump 14 is required to pressure feed a necessary amount of fuel exactly metered to control the fuel pressure in the common rail 16 to a desired pressure. Therefore, the fuel injection device 10 has a suction amount control valve (not shown) of the linear solenoid type by which the amount of fuel supplied to a plunger chamber is controlled by varying an area of a suction port.

The high-pressure fuel in the common rail 16 is supplied to the injectors 17. Each of the injectors 17 is driven to open a valve so that the high pressure fuel is directly injected into the engine cylinders from the common rail 16.

The injector 17 includes a solenoid, a two-way valve, an outlet orifice, an inlet orifice, a command piston, a nozzle needle, and the like. In a state that no current is fed to the solenoid, the two-way valve is pressed-downward by spring force, and the outlet orifice of the injector 17 is in a closed state. Therefore, when the command piston is pressed downward, the pressure in the control chamber located at the upper end of the command piston is equal to the pressure to push the nozzle needle upward. However, the pressure receiving area difference and a nozzle spring force cause the nozzle needle to be in contact with the seat part to keep a valve closing state, whereby no fuel injection is performed.

When current is fed to the solenoid, the two-way valve is pulled upward by a suction force by the solenoid, the outlet orifice opens, and the fuel flows upward from the control chamber. When the fuel flows out, the control chamber pressure acting downward on the command piston decreases, the command piston and the nozzle needle ascend, and fuel injection through the nozzle orifice starts. When the current is continuously fed to the solenoid, the nozzle needle reaches the maximum lift position, and the maximum injection rate state is achieved.

When the feeding of the current to the solenoid is stopped, the two-way valve descends to close the outlet orifice. Thus, the fuel enters the control chamber via the inlet orifice to increase the pressure in the control chamber. As a result, the nozzle needle rapidly descends to come into contact with the seat part, and the nozzle orifice is closed and the fuel injection ends.

Accordingly, the fuel injection timing is controlled by controlling the timing of the current feeding to the solenoid. The fuel injection amount is controlled by controlling the time (amount of time) of current feeding to the solenoid. The engine fuel injection control apparatus is preferably configured and arranged to perform a multi-injection control in which a plurality of injections are executed during one cycle of engine operation by repeating feeding/interrupting of the current to the solenoid for a plurality of times.

The common rail fuel injection apparatus 10 is a conventional component that is well known in the art. Since the common rail fuel injection apparatus 10 is well known in the art, these structures will not be discussed or illustrated in detail herein. Rather, it will be apparent to those skilled in the art from this disclosure that the components can be any type of structure and/or programming that can be used to carry out the present invention.

The variable capacity turbocharger 21 is provided in the exhaust passage 2 located downstream of the EGR passage 4. The variable capacity turbocharger 21 includes a turbine 22 and a compressor 23 that are coaxially coupled with each other. The turbine 22 is configured and arranged to convert the thermal energy of the exhaust gas into rotation energy. The compressor 23 is configured and arranged to compress intake air. A variable nozzle 24 (variable capacity mechanism) that is driven by an actuator 25 is provided at the scroll inlet of the turbine 22. The variable nozzle 24 is controlled by the engine controller 31 to produce a predetermined supercharging pressure from a low engine rotation speed region. More specifically, in the low rotation speed region, the variable nozzle 24 is controlled to the degree of opening of the nozzle (inclining state) at which a velocity of the exhaust gas introduced into the turbine 22 is relatively high. In the high rotation speed region, the variable nozzle 24 is controlled to the nozzle opening degree (full opening state) at which the exhaust gas is introduced into the turbine 22.

The actuator 25 includes a diaphragm actuator 26 configured and arranged to drive the variable nozzle 24 in response to a control pressure, and a pressure control valve 27 configured and arranged to adjust a control pressure to the diaphragm actuator 26. The engine controller 31 is configured to set a duty control signal so that an actual opening degree of the variable nozzle 24 is equal to a target nozzle opening, and to output the duty control signal to the pressure control valve 27.

As seen in FIG. 1, an intake throttle valve 42 driven by an actuator 43 is provided at the inlet of the collector 3a. The actuator 43 includes a diaphragm actuator 44 configured and arranged to drive the intake throttle valve 42 in response to the control pressure, and a pressure control valve 45 configured and arranged to adjust a control pressure to the diaphragm actuator 44. The engine controller 31 is configured to set a duty control signal so as to control an opening degree of the intake throttle valve 42 to a target opening degree, and to output the duty control signal to the pressure control valve 45.

The engine controller 31 is configured to receive a signal indicative of an acceleration opening (pressing amount of an acceleration pedal) from an acceleration sensor 32, a signal indicative of an engine rotation speed from a crank angle sensor (rotation speed sensor) 33, a signal indicative of a cooling water temperature from a water temperature sensor 34, a signal indicative of the amount of intake air from an air flow meter 35, a signal indicative of engine vibration from a knock sensor 39, and a signal indicative of a NOx concentration from an NOx concentration sensor 40. The engine controller 31 is configured to calculate a fuel injection timing and a fuel injection amount based on an input engine load (e.g., acceleration opening) and an engine speed, and to output a valve opening command signal to the injectors 17 corresponding to the fuel injection timing and the fuel injection amount.

Moreover, the engine controller 31 is configured to calculate a target common rail fuel pressure based on the engine load and the engine rotation speed, and to control the suction amount control valve of the fuel injection device 10 so that an actual fuel pressure in the common rail 16 is equal to the target common rail fuel pressure. The actual fuel pressure in the common rail 16 is detected by a pressure sensor coupled to the common rail 16. The engine controller 31 is configured to perform the EGR control and the supercharging pressure in a harmonizing manner so as to obtain a target EGR rate and a target supercharging pressure.

The engine controller 31 preferably includes a microcomputer with a deterioration determination control program and an increment-correction control program as discussed below. The engine controller 31 can also include other conventional components such as an input interface circuit and an output interface circuit (I/O interface), and storage devices such as a ROM (Read Only Memory) device and a RAM (Random Access Memory) device. The microcomputer of the engine controller 31 is programmed to control the various components of the engine 1. The memory circuit stores processing results and control programs that are run by the processor circuit. The engine controller 31 is operatively coupled to the various components of the engine 1 in a conventional manner. The internal RAM of the engine controller 31 stores statuses of operational flags and various control data. The engine controller 31 is capable of selectively controlling any of the components of the control system of the engine 1 in accordance with the control program. It will be apparent to those skilled in the art from this disclosure that the precise structure and algorithms for the engine controller 31 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

As seen in FIG. 1, a filter (particulate filter) 41 for collecting particulate in the exhaust gas is installed in the exhaust passage 2. When a particulate deposition amount of the filter 41 reaches a predetermined value (threshold value), a process for regenerating the filter starts to remove the particulate deposited on the filter 41 by burning.

A differential pressure sensor 36 is provided in a differential pressure detecting passage that bypasses the filter 41 to detect a pressure loss $\Delta P$ in the filter 41 (differential pressure between the upstream position and the downstream position in the filter 41). Moreover, an inlet temperature sensor 37 and an outlet temperature sensor 38 are provided to detect a filter inlet temperature T1 and a filter outlet temperature T2, respectively. The pressure loss $\Delta P$ in the filter 41 detected by the differential pressure sensor 36, and the filter inlet temperature T1 and the filter outlet temperature T2 are sent to the engine controller 31. The engine controller 31 is configured to determine whether regeneration time of the filter 41 comes based on the detected values. Then, if it is determined that the regeneration time of the filter 41 comes, the engine controller 31 is configured to increase the temperature of the filter 41 by using a conventional exhaust-gas temperature increasing method (e.g., controlling the air excess ratio to a value near a smoke limit value) to regenerate the filter 41.

It is necessary to increase the burning temperature of particulate as high as possible within a tolerable temperature of the filter 41 during the regeneration process to perform a complete regeneration of the filter 41 in which particulate deposited on the filter 41 is burned. Therefore, in this illustrated embodiment, a carrier forming the filter 41 is preferably coated with oxidation catalyst. The oxidation catalyst promotes the oxidation reaction in burning the particulate to effectively increase a bed temperature of the filter 41 correspondingly. Thus, the burning of the particulate in the filter 41 is promoted.

The engine controller 31 is configured to detect a bed temperature Tbed of the filter 41, which carries the oxidation catalyst, and to calculate an effective regeneration period te by adding time periods during which the detected bed temperature exceeds a target bed temperature Tx. The engine controller 31 is configured to estimate a particulate regeneration amount PMr as a combustion eliminating amount of the particulate deposited on the filter 41 based on the effective regeneration period te. Further, the engine controller 31 is configured to calculate a regeneration efficiency $\eta$PM based on the estimated particulate regeneration amount PMr. The engine controller 31 is configured to set a target inlet temperature Td to a high temperature depending on the calculate regeneration efficiency $\eta$PM. The control described in Japanese Laid-Open Patent Application No. 2004-343595 can be used in the filter regeneration control to regenerate the filter 41. Moreover, the regeneration control of the filter 41 is not limited to the control described above. Rather, the filter 41 may be regenerated by using any conventional method.

Figure 2:
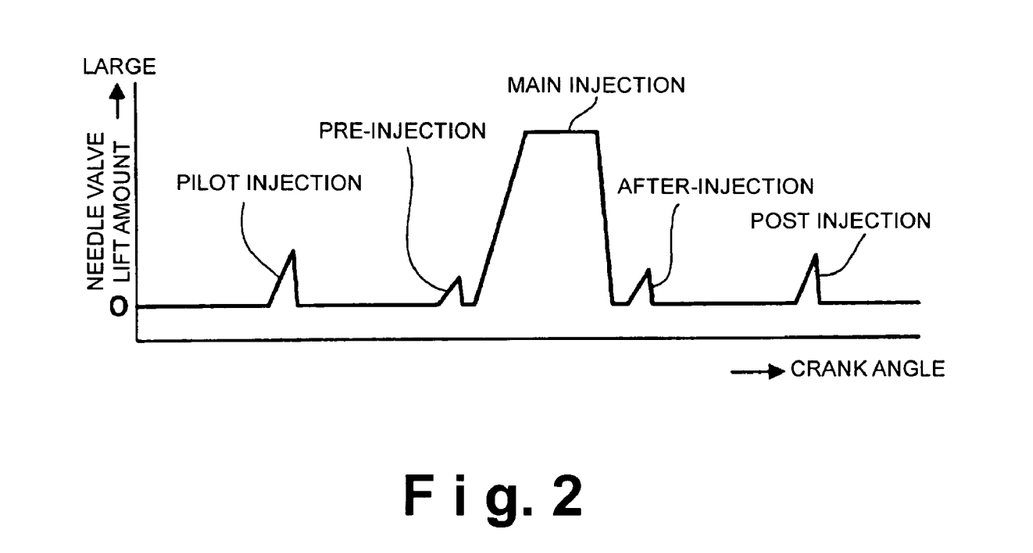
FIG. 2 is a diagrammatic chart illustrating an example of fuel injection timings in a multi-injection control in accordance with the illustrated embodiment of the present invention.

As mentioned above, the engine controller 31 is configured to perform the multi-injection control in which fuel is injected for a plurality of times during one cycle of engine operation. Referring now to FIG. 2, the multi-injection control executed by the engine controller 31 will be described. FIG. 2 illustrates an example of the fuel injection timings illustrated in a waveform of the lift amount of the needle valve of the injector 17 with respect to the crank angle of the engine 1. In FIG. 2, waveform peaks indicate a pilot injection, a pre-injection, a main injection, an after-injection, and a post-injection as viewed from left to right. Among those five injections, the four injections except the main injection are categorized as a micro-injection having a minute fuel injection amount. More specifically, in the illustrated embodiment, the micro-injection includes the following four modes.

Figure 3:
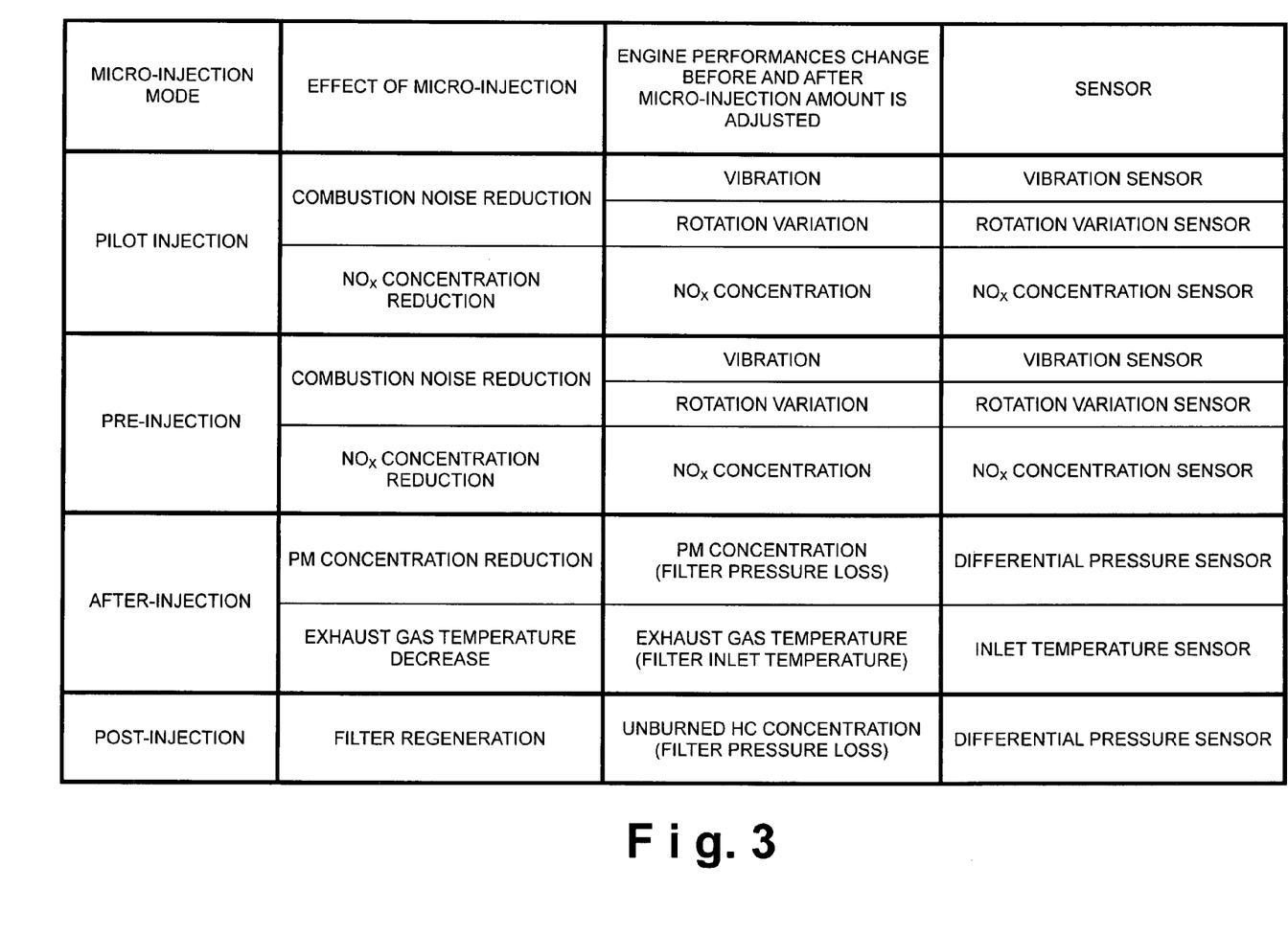
FIG. 3 is a table summarizing, for each type of micro-injections, effects intended by the micro-injection, parameters relating to combustion noise and parameters relating to exhaust emission which are changed before and after the micro-injection is stopped or the micro-injection amount is reduced, and sensors for detecting the parameters in accordance with the illustrated embodiment of the present invention.

Micro-Injection Mode 1→pilot injection
Micro-Injection Mode 2→pre-injection
Micro-Injection Mode 3→after-injection
Micro-Injection Mode 4→post-injection The effects of those four types of micro-injections, generally mentioned so, are briefed in the table of FIG. 3.

When the pilot injection is performed at an injection timing that is greatly advanced from an injection timing of the main injection (FIG. 2), a ratio of the premixing combustion increases to reduce the combustion noise and the NOx concentration.

When the pre-injection is performed at an injection timing immediately before an injection timing of the main injection (FIG. 2), the fuel injected in the pre-injection provides a spark so that a delay in the ignition timing of the fuel injected in the main injection is reduced, the heat release rate in the premixing combustion is reduced, and thus, the combustion noise is reduced. The NOx concentration is also reduced when the pre-injection is performed as shown in FIG. 3.

When the after-injection is performed at an injection timing immediately after an injection timing of the main injection (FIG. 2), the diffuse combustion is activated to reduce the particulate generated in the main injection. Also, the filter inlet temperature T1 decreases when the after-injection is performed.

When the post-injection is performed at timing greatly delayed from the main injection, the unburned HC may be supplied to the filter 41, and the particulate deposited on the filter 41 are burnt and removed, so that the filter 41 is regenerated.

When the fuel injection amount of the injector 17 decreases as the result of deterioration of the injector 17 over time, there is the possibility that the micro-injection in the multi-injection control is not actually performed. However, if a lower limit value is set to an initial set value of the micro-injection amount so as to secure the micro-injection even if the fuel injection amount of the injector 17 decreases as the result of time deterioration, it is impossible to initially set a micro-injection amount at a value that is below the lower limit value.

Therefore, in the present invention, in order to determine whether the injector 17 suffers from the time deterioration, which decreases the fuel injection amount, the engine controller 31 is configured to intentionally stop the micro-injection or to intentionally set the micro-injection amount to a lower value than an optimum initial set value to determine whether or not the micro-injection is actually performed or if the micro-injection amount is insufficient. If the micro-injection is not actually performed or if the micro-injection amount is insufficient, the engine controller 31 is configured to correct or revise the micro-injection amount by increasing the micro-injection amount from the optimum initial set value.

The factor to decrease the fuel injection amount of the injector 17 may be that a friction of wear of a nozzle seat part, for example, becomes large, so that the seat diameter becomes large. The factors to increase the wear of the nozzle seat part may be the large common rail pressure (e.g., 180 MPa) and the large heat of the nozzle of the injector 17 when heated. The variation of the injection amount of the injector 17, which is due to the time deterioration of the injector 17, may be due to the fact that the fuel pressure assist at the nozzle needle tip varies as the result of the wear of the nozzle seat part.

More specifically, as mentioned above, the injector 17 stops the fuel injecting operation by pressing the nozzle needle against the outlet orifice of the nozzle tip. The injector 17 starts the fuel injecting operation by lifting the nozzle needle from the outlet orifice of the nozzle tip. The nozzle seat part is provided for pressing the nozzle needle against the nozzle tip. When the pressing operation is frequently performed, the nozzle seat possibly increases its diameter. If the diameter of the nozzle seat is large, its fuel pressure receiving area to raise the nozzle needle (to open the valve) becomes small. If the fuel pressure receiving area is small, the timing of starting the nozzle needle valve opening delays from a prescribed timing set by the initial set value. As a result, the fuel injection amount decreases.

In the present invention, in order to determine whether the injector 17 suffers from the time deterioration, the engine controller 31 is configured to change the micro-injection parameter in one of the following two modes.

First Mode for Changing the Micro-injection Parameter—In the first mode for changing the micro-injection parameter, the engine controller 31 is configured to decrease a fuel injection amount injected in the micro-injection. More specifically, the engine controller 31 is configured to stop the micro injection by setting the micro-injection amount to zero.

Second Mode for Changing the Micro-injection Parameter—In the second mode for changing the micro-injection parameter, the engine controller 31 is configured to advance or retard the injection timing of the micro-injection from an optimum set timing so that no effect of the micro-injection is produced in the engine performances.

The engine controller 31 is configured to detect the engine performances relating to the micro-injection effect by corresponding sensors before and after the micro-injection parameter is changed in one of the first and second modes. More specifically, the engine controller 31 is configured to detect the engine performances relating to the micro-injection effect by corresponding sensors in two cases: when the micro-injection amount is performed without changing the micro-injection parameter and when the micro-injection parameter is changed (either in the first mode or the second mode). In case where a difference between the sensor output levels (i.e., a difference between the engine performances) when the micro-injection is performed before and after the micro-injection parameter is changed is larger than a threshold value, the engine controller 31 is configured to determine that the actual micro-injection is performed or the micro-injection amount is sufficient. In case where the difference between the sensor output levels before and after the micro-injection parameter is changed is smaller than a threshold value, the engine controller 31 is configured to determine that the actual micro-injection is not performed or the micro-injection amount is insufficient. In other words, the engine controller 31 is configured to determine that the injector 17 has deteriorated by aging, and the injection amount of the injector 17 is decreased. When the engine controller 31 determines that the micro-injection is not actually performed or the micro-injection amount is insufficient, the engine controller 31 is configured to correct the micro-injection amount by increasing the micro-injection amount from its optimum initial set value.

The engine performances that change between before and after the micro-injection parameter is changed are physical quantities corresponding to the effects by the micro-injection, which are shown in the table of FIG. 3. More specifically, the engine performances, which change between before and after the micro-injection parameter is changed in the pilot injection or the pre-injection, are vibrations, rotation variation, and NOx concentration. In case where the injection parameter in the pilot injection or the pre-injection is changed (either in the first mode to stop the pilot injection or the pre-injection, or in the second mode to change the injection timing of the pilot injection or the pre-injection), the vibration and the rotation variation are larger than those when the pilot injection or the pre-injection is performed without changing the injection parameter, and the NOx concentration increases. The vibration and the rotation variations are detected by the vibration sensor (or the knock sensor 39) and a rotation variation sensor (or the rotation speed sensor 33) before and after the micro-injection parameter is changed. If the vibration difference or the rotation variation difference before and after the micro-injection parameter is changed exceeds a threshold value, the engine controller 31 is configured to determine that the pilot injection or the pre-injection is actually performed or the pilot injection amount or the pre-injection amount is sufficient. If the vibration difference or the rotation variation difference before and after the micro-injection parameter is changed is below the threshold value, the engine controller 31 is configured to determine that the pilot injection or the pre-injection is not actually performed or the pilot injection amount or the pre-injection amount is insufficient.

The NOx concentrations are detected by the NOx concentration sensor 40 when the pilot injection or the pre-injection is performed before and after the micro-injection parameter of the pilot injection or the pre-injection is changed. When the difference of the detected NOx concentrations before and after the micro-injection parameter is changed exceeds a threshold value, the engine controller 31 is configured to determine that the pilot injection or the pre-injection is actually performed or the pilot injection amount or the pre-injection amount is sufficient. When the difference of the detected NOx concentration before and after the micro-injection parameter is changed is below the threshold value, the engine controller 31 is configured to determine that the pilot injection or the pre-injection is not actually performed or the pilot injection amount or the pre-injection amount is insufficient.

The engine performances which change between before and after the micro-injection parameter of the after-injection is changed (either in the first mode to stop the after-injection or in the second mode to change the injection timing of the after-injection) are a particulate concentration (the pressure loss $\Delta P$ of the filter 41) as a particulate exhausting amount per predetermined time, and exhaust gas temperature (filter inlet temperature T1). When the injection amount in the after-injection is decreased or set to zero, the particulate concentration increases and the exhaust gas temperature rises compared to those when the after-injection is performed without changing the injection parameter. Accordingly, the pressure loss of the filter 41 is detected by the differential pressure sensor 36 before and after the micro-injection parameter is changed. If the difference between the pressure losses of the filter 41 before and after the micro-injection parameter is changed exceeds a threshold value, the engine controller 31 is configured to determine that the after-injection is actually performed or the after-injection amount is sufficient. On the other hand, in case where the difference between the pressure losses of the filter 41 before and after the micro-injection parameter is changed is below the threshold value, that is, the pressure loss of the filter 41 is substantially equal between before and after the micro-injection parameter is changed, the engine controller 31 is configured to determine that the after-injection is not actually performed or the after-injection amount is insufficient.

The filter inlet temperature T1 is detected by the inlet temperature sensor 37 before and after the micro-injection parameter of the after-injection is changed. When the difference between the filter inlet temperatures T1 before and after the micro-injection parameter is changed exceeds a threshold value, the engine controller 31 is configured to determine that the after-injection is actually performed or the after-injection amount is sufficient. When the difference between the filter inlet temperatures T1 before and after the before and after the micro-injection parameter is changed is below a threshold value, the engine controller 31 is configured to determine that the after-injection is not actually performed or the after-injection amount is insufficient.

The engine performance that changes before and after the micro-injection parameter of the post-injection is changed (either in the first mode to stop the post-injection or in the second mode to change the injection timing of the post-injection) is unburned HC concentration exhausted from the engine (pressure loss of the filter 41). If the post-injection is not performed or the post-injection amount is insufficient, no unburned HC is supplied to the filter 41, and the particulate deposited on the filter 41 is insufficiently burnt and removed. Accordingly, the pressure loss of the filter 41 is larger than that when the post-injection is performed. Accordingly, the pressure loss of the filter 41 is detected by the differential pressure sensor 36 before and after the micro-injection parameter is changed. When the difference between the detected pressure losses of the filter 41 before and after the micro-injection parameter is changed exceeds a threshold value, the engine controller 31 is configured to determine that the post-injection is actually performed or the post-injection amount is sufficient. When the difference between the detected pressure losses of the filter 41 before and after the micro-injection parameter is changed is below the threshold value, the engine controller 31 is configured to determine that the post-injection is not actually performed or the post-injection amount is insufficient.

The sensors for detecting the engine performances that change between before and after the micro-injection parameter is changed are listed below.

Sensor 1→the vibration sensor (or the knock sensor 39)
Sensor 2→the rotation variation sensor (or the rotation speed sensor 33)
Sensor 3→the NOx concentration sensor 40
Sensor 4→the differential pressure sensor 36
Sensor 5→the filter inlet temperature sensor 37

Next, the injection amount correction control executed by the engine controller 31 will be explained in more detail. When the engine controller 31 determines the micro-injection is not actually performed or the micro-injection amount is insufficient as described above, the engine controller 31 is configured to correct the micro-injection amount in one of the following two increment-correction modes for revising the micro-injection amount by increasing the micro-injection amount from its optimum initial set value.

First Increment-Correction Mode—In the first increment-correction mode, the engine controller 31 is configured to concurrently correct the micro-injection amounts for all the cylinders by increasing their amounts from the optimum initial set value. In the first increment-correction mode, first and second maps are prepared. The first map provides an optimum set value of the micro-injection amount in a state that the injector 17 has not yet deteriorated as the result of the time deterioration. A second map provides a corrected optimum set value of the micro-injection amount in a state that the injector 17 has deteriorated as the result of the time deterioration. The corrected optimum set values of the second map are set to be larger than corresponding values of the first map. When the engine controller 31 determines that the micro-injection is not performed or the micro-injection amount is insufficient, the map for providing an optimum set value of the micro-injection amount is switched from the first map to the second map. As a result, the micro-injection amount is increased from the optimum initial value to the corrected optimum set value.

Second Increment-Correction Mode—In the second increment-correction mode, the engine controller 31 is configured to separately correct the micro-injection amount for each cylinder by increasing the injection amount from the optimum initial set value. For example, in case where an optimum value of the micro-injection amount is initially set for each cylinder, a corrected optimum set value of the micro-injection is obtained by adding a predetermined correction amount to the optimum initial set value of the micro-injection amount of each cylinder. As a result, the micro-injection amount is increased from the optimum initial set value to the corrected optimum set value.

As seen from the foregoing description, in the multi-injection control in the illustrated embodiment of the present invention, there are four micro-injection modes (i.e., the pilot injection, the pre-injection, the after-injection and the post-injection), two modes for changing the micro-injection parameter (i.e., the first mode to stop the micro-injection and the second mode to change the micro-injection timing), five sensors (i.e., the vibration sensor (or the knock sensor 39), the rotation variation sensor (or the rotation speed sensor 33), the NOx concentration sensor 40, the differential pressure sensor 36 and the filter inlet temperature sensor 37), and two increment-correction modes (i.e., the first mode to concurrently correct the micro-injection amount for all the cylinders and the second mode to separately correct the micro-injection amount for each cylinder). Therefore, the multi-injection control in the illustrated embodiment of the present invention may be executed by using any of 80 combinations (4×2×5×2=80).

In this case, among those engine performances shown in FIG. 3, the vibration and the rotation variation are detected for each cylinder (each injector 17). Accordingly, the engine controller 31 can perform the multi-injection control (the deterioration determination control and the injection amount correction control) separately for each injector 17. On the other hand, the remaining physical quantities (i.e., the NOx concentration, the particulate concentration, the exhaust gas temperature, and the unburned HC concentration) cannot be detected for each cylinder (each injector 17). Therefore, in this case, the engine controller 31 is configured to concurrently perform the multi-injection control (the deterioration determination control and the injection amount correction control) for all the cylinders (all the injectors 17).

Figure 4:
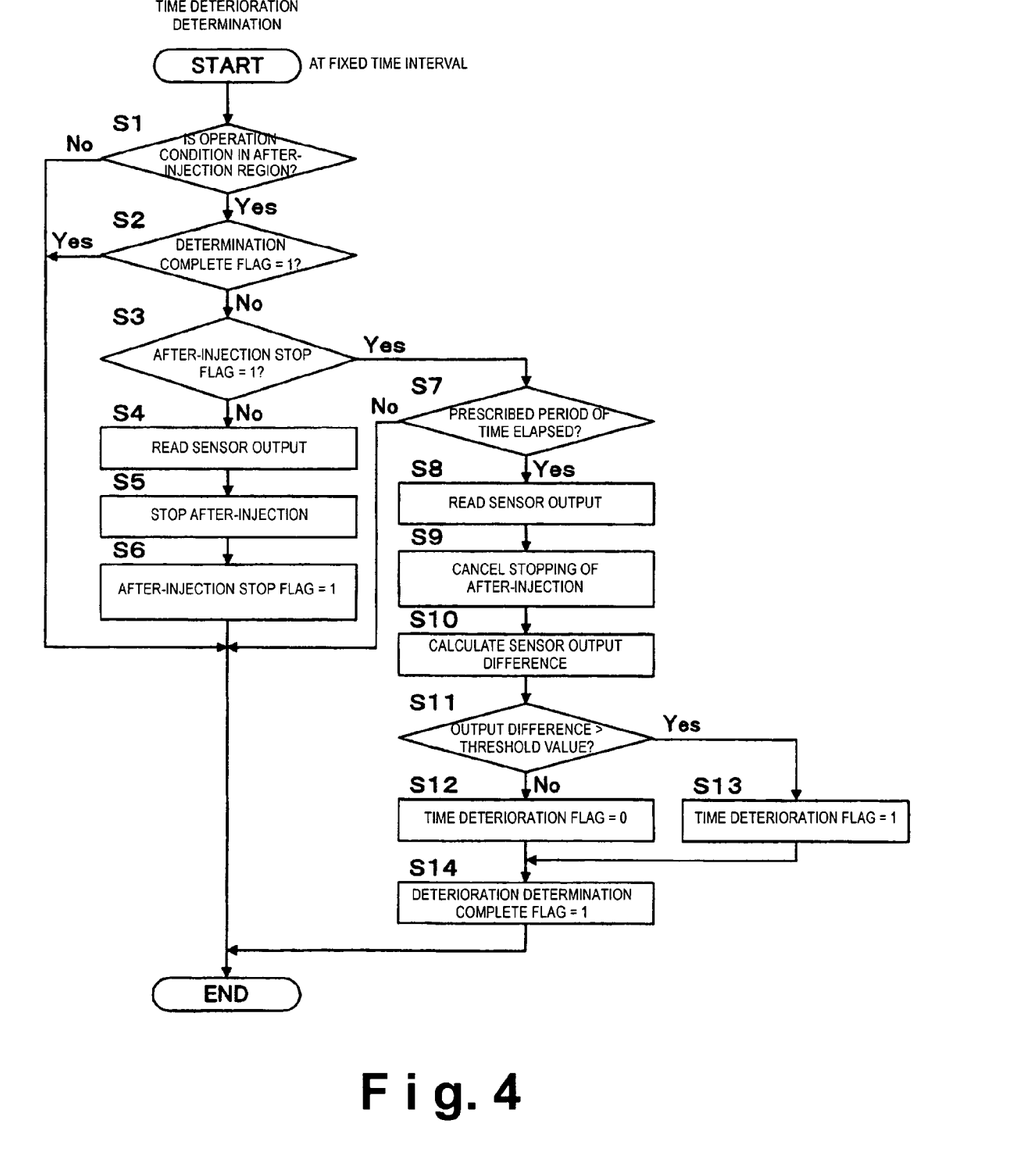
FIG. 4 is a flowchart illustrating a deterioration determination control executed by the engine fuel injection control apparatus to determine whether or not an injection amount in the micro-injection has decreased by the time deterioration of an injector in accordance with the illustrated embodiment of the present invention.
Figure 5:
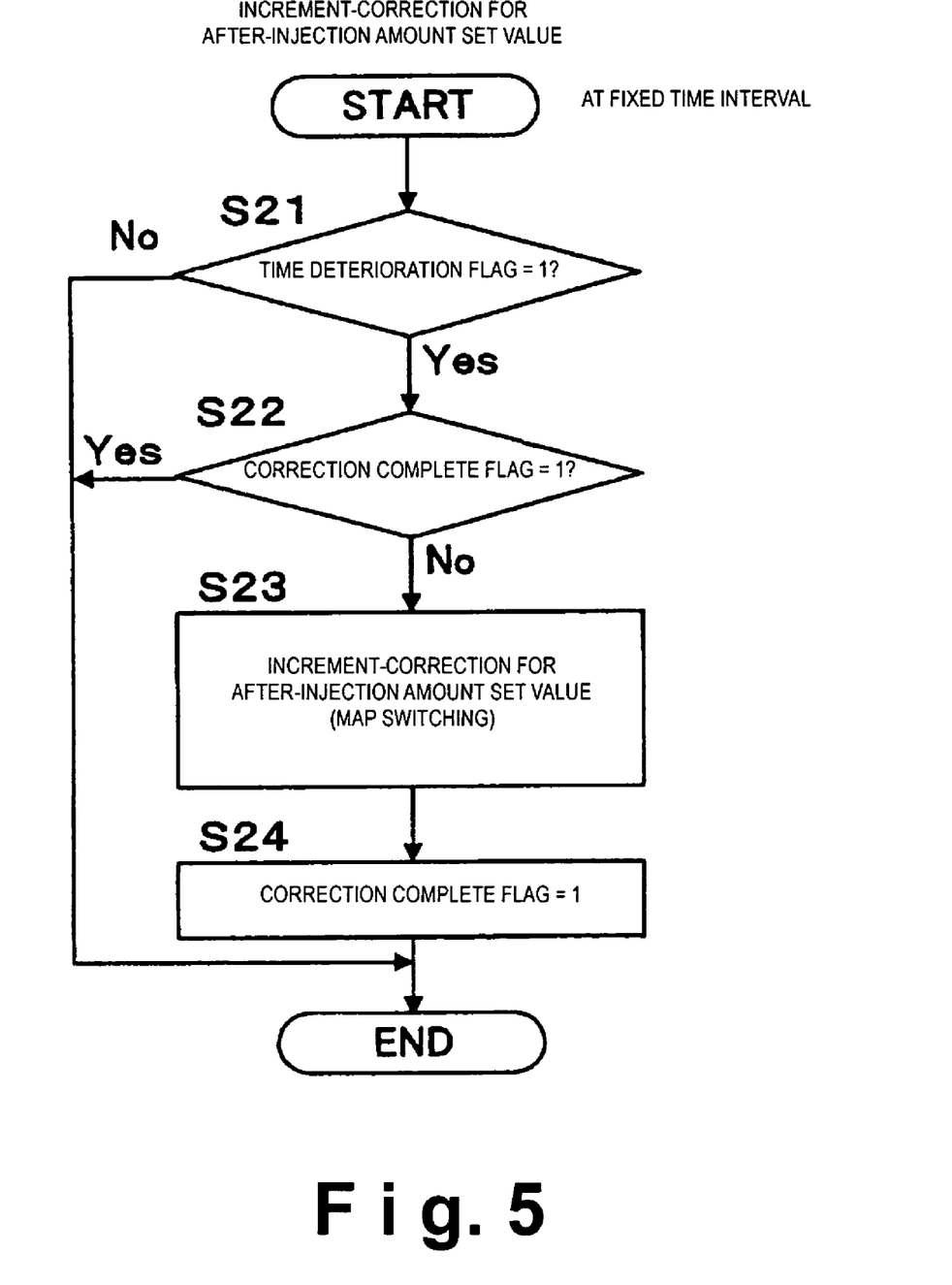
FIG. 5 is a flowchart illustrating a injection amount correction control executed by the engine fuel injection control apparatus to revise the injection amount in the micro-injection from an optimum initial set value to a corrected optimum set value in accordance with the illustrated embodiment of the present invention.

Referring now to the flowcharts of FIGS. 4 and 5, the controls executed by the engine controller 31 will be described in more detail. In the description, the after-injection is used as an example of the micro-injection for simplicity of explanation. FIG. 4 is the flowchart of the deterioration determination control executed by the engine controller 31 to determine whether or not the micro-injection amount has decreased by time deterioration of the injector 17. The process illustrated in FIG. 4 is executed at fixed time intervals (e.g., 10 msec).

As mentioned above, the differential pressure sensor 36 is configured and arranged to detect a pressure loss ΔP of the filter 41 as a particulate concentration and the filter inlet temperature sensor 37 is configured and arranged to detect the filter inlet temperature T1 as an exhaust gas temperature, which represent the engine performances relating to the effects intended by the after-injection. It is impossible to distinguish between the injectors 17 of the cylinders by using the differential pressure sensor 36 and the filter inlet temperature sensor 37. Accordingly, the deterioration determination control performed in the example shown in FIG. 4 is the concurrent control for all the cylinders.

In step S1, the engine controller 31 is configured to determine whether or not the engine operation condition is in a prescribed after-injection region. If the engine operation condition is not in the after-injection region (No in step S1), the control process ends.

If the engine operation condition is the after-injection region (Yes in step S1), the engine controller 31 advances to step S2 to determine a value of a deterioration determination complete flag. The deterioration determination complete flag is initially set to 0 at the start of operating the engine 1. When the engine controller 31 advances to the step S2 for the first time after the operation of the engine 1 has started, the deterioration determination complete flag is 0 (No in step S2). Accordingly, the engine controller 31 advances to step S3 in which the engine controller 31 is configured to determine an after-injection stop flag. The after-injection stop flag is also initially set to 0 at the start of operating the engine. When the engine controller 31 advances to the step S3 for the first time after the operation of the engine 1 has started, the after-injection flag is 0 (No in step S3). Accordingly, the engine controller 31 advances to step S4 in which the engine controller 31 is configured to store an output signal from the sensor for detecting the engine performance relating to the effect intended by the after-injection into the memory of the engine controller 31. In this example, the sensor output signal stored is the pressure loss ΔP of the filter 41 detected by the differential pressure sensor 36 or the filter inlet temperature T1 detected by the filter inlet temperature sensor 37.

In step S5, the engine controller 31 is configured to change the micro-injection parameter of the after-injection amount. More specifically, in this example, the engine controller 31 is configured to adjust the after-injection amount in the first mode to stop the after-injection (i.e., the after-injection amount is set to zero). The engine controller 31 may be configured to decrease the after-injection amount from the optimum initial set value instead of setting the after-injection amount to zero. Moreover, the engine controller 31 may be configured to change the micro-injection parameter in the second mode in step S5 to advance or retard the injection timing of the after-injection (micro-injection timing) from an optimum set value.

In step S6, the engine controller 31 is configured to set a value of the after-injection stop flag to 1, which indicates that the after-injection has stopped.

When the value of the after-injection stop flag is set to 1 in the step S6, and then the engine operation condition is continuously in the after-injection region, the engine controller 31 advances from step S3 to step S7 in the next control cycle. In step S7, the engine controller 31 is configured to determine whether or not a state that the after-injection is stopped has continued for a prescribed period of time. The prescribed period of time used in step S7 is a time taken for the engine controller 31 to wait until the variation of the engine performance relating to the effect intended by the after-injection settles down after the after-injection is stopped. If the prescribed period of time has not elapsed in step S7, this control cycle ends. In such case, the state that the after-injection is stopped still continues.

When the prescribed time has elapsed in step S7 (Yes in step S7), the engine controller 31 advances from the step S7 to step S8. In step S8, the engine controller 31 is configured to read an output signal from the sensor for detecting the engine performance relating to the effect intended by the after-injection, and to store the output signal in another section of the memory. The sensor output signal stored in step S8 in this example, as in step S4, is ΔP of the filter 41 detected by the differential pressure sensor 36 or the filter inlet temperature T1 detected by the filter inlet temperature sensor 37.

The values of the signal output from the sensor before and after the after-injection is stopped are obtained in step S4 and step S8. Accordingly, the engine controller 31 is configured to cancel the stopping of the after-injection in step S9 to control the injectors 17 to perform the after-injection.

In step S10, the engine controller 31 is configured to calculate the difference between the sensor output signals (the difference between the pressure losses ΔP of the filter 41 or the difference between the filter inlet temperatures T1)

before and after the after-injection is stopped obtained in step S4 and step S8, respectively.

In step S11, the engine controller 31 is configured to compare the difference between the pressure losses ΔP of the filter 41 or the difference between the filter inlet temperatures T1 calculated in step S10 with a threshold value. The threshold value to be compared with the difference between the pressure losses ΔP of the filter 41 is different from the threshold value to be compared with the difference between the filter inlet temperatures T1.

If the difference between the pressure losses ΔP of the filter 41 or the difference between the filter inlet temperatures T1 exceeds the corresponding threshold value in step S11 (Yes in step S11), the engine controller 31 is configured to determine that the after-injection is actually performed or the after-injection amount is sufficient, and thus, the injection amount has not decreased as the result of the time deterioration of the injectors 17. The engine controller 31 is then advances from step S11 to step S12, and to set a value of the time deterioration flag to 0.

If the difference between the pressure losses ΔP of the filter 41 or the difference between the filter inlet temperatures T1 is below the corresponding threshold value in step S11 (No in step S11), the engine controller 31 is configured to determine that the after-injection is not actually performed and the after-injection amount is insufficient. In such case, the engine controller 31 advances from step S11 to step S13, and to set a value of the time deterioration flag to 1.

The deterioration determination control process for determining the time deterioration of the injector 17 ends, and thus, the engine controller 31 is configured to set a value of the deterioration determination complete flag to 1 in step S114. The engine controller 31 ends this control cycle.

Since the deterioration determination complete flag is set to 1 in the step S114, the engine controller 31 does not advance to step S3 in the next control cycle even if the engine operation condition is in the after-injection region in step S1. Thus, the engine controller 31 is configured to determine whether or not the injection amount has decreased as the result of the time deterioration of the injector 17 only once after the warming-up of the engine 1 ends and the engine operation condition has been in the after-injection region. The reason for this is that the determination of the time deterioration of the injectors 17 is not required to be performed at a short interval. Even if the time deterioration determination control process is performed at a short interval, the result of the determination does not frequently change. Frequent execution of the time deterioration determination control process at a short interval possibly hinders the after-injection. In such case, the particulate concentration becomes unintentionally large. Therefore, the time deterioration determination is performed once for each operation of the engine 1.

Next, referring to FIG. 5, an injection amount correction process performed by increasing the after-injection amount from the optimum initial set value will be explained. This process illustrated in FIG. 5 follows the process illustrated in FIG. 4, and is executed at fixed time intervals (e.g., 10 msec).

In step S21, the engine controller 31 is configured to determine the value of the time deterioration flag, which is set in step S12 or S13 of FIG. 4. When the time deterioration flag is 0 in step S21 (No in step S21), the process in this control cycle ends.

When the time deterioration flag is 1 in step S21, the after-injection amount is insufficient or the injector 17 has been incapable of performing the after-injection. In this case, the after-injection amount needs to be increased so that the after-injection amount is sufficient or the injector 17 is capable of performing the after-injection. Accordingly, the engine controller 31 advances to step S22, in which the engine controller 31 is configured to determine the value of a correction complete flag of the after-injection amount. The value of the correction complete flag is initially set to 0 when the engine 1 starts to operate. When the engine controller 31 first proceeds to step S22 after the engine operation starts, the correction complete flag is 0 (No in step S22), and thus, the engine controller 31 advances to step S23. In step S23, the engine controller 31 is configured correct the after-injection amount using the first increment-correction mode. More specifically, the engine controller 31 is configured to switch from the first map to the second map for determining the optimum set value of the after-injection amount. As mentioned above, the first map provides an optimum set value of the after-injection amount in a state that the injection amount has not decreased as the result of the time deterioration of the injectors 17. The second map provides a corrected optimum set value of the after-injection amount in a state that the injection amount has decreased as the result of the time deterioration of the injectors 17. By the map switching in step S23, the after-injection amount is increased from its optimum initial set value to the corrected optimum initial set value.

As mentioned above, the first and second maps are prepared in advance for providing an optimum set value of the after-injection amount. The first map provides an optimum set value of the after-injection amount in a state that the injection amount has not decreased as the result of the time deterioration of the injectors 17. The second map provides a corrected optimum set value of the after-injection amount in a state that the injection amount has decreased as the result of the time deterioration of the injectors 17. The corrected optimum set values of the second map are set to be larger than the corresponding values of the first map.

By the map switching executed by the engine controller 31 in step S23, the correction operation of increasing the after-injection amount from the optimum initial set value ends, and thus, the engine controller 31 is configured to set a value of the correction complete flag to 1 in step S24.

Since the correction complete flag is set to 1 in step S24, the engine controller 31 does not advance from step S22 to step S23 and the subsequent control steps in the subsequent control cycles. In other words, once the correction complete flag is set to 1 in step S24 (i.e., once the engine controller 31 instructs the corrected optimum set value of the after-injection amount based on the second map after in a state that the injection amount has been caused by the time deterioration of the injector 17), the after-injection will be performed with the corrected optimum set value, and thus, insufficient after-injection amount does not occur.

Figure 6:
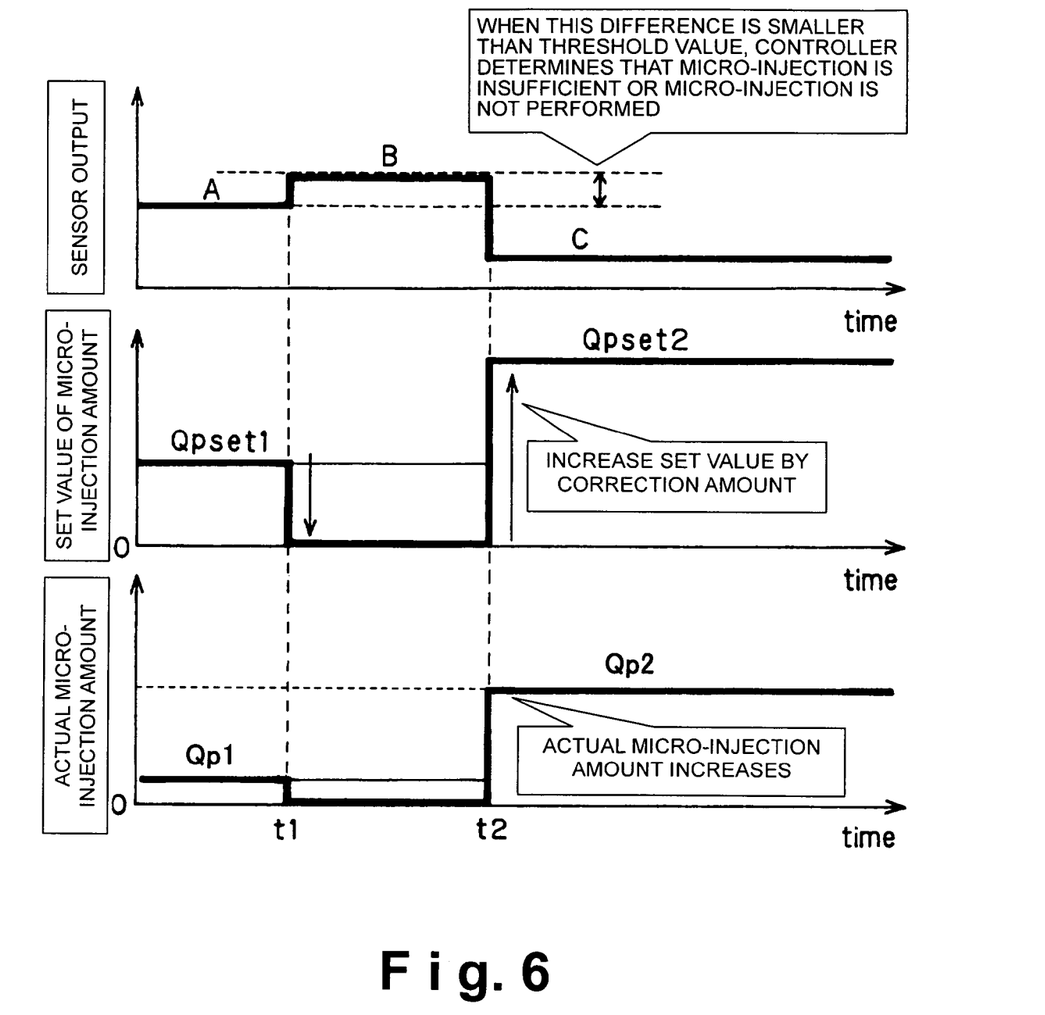
FIG. 6 is a time chart illustrating the sensor output, the set value of the micro-injection amount, and the actual micro-injection amount when the deterioration determination control and the injection amount correction control are executed in a case the injection amount in the micro-injection has decreased as the result of the time deterioration of the injector in accordance with the illustrated embodiment of the present invention.

FIG. 6 is a time chart illustrating the sensor output, the set value of the micro-injection amount, and the actual micro-injection amount when the deterioration determination control and the injection amount correction control are executed in a case the injection amount in the micro-injection has decreased as the result of the time deterioration of the injectors 17 in accordance with the illustrated embodiment of the present invention. In this description, the pilot injection is used as an example of the micro-injection and the sensor used is the rotation speed sensor 33. As shown in FIG. 6, the pilot injection continues with an optimum initial set value Qpset1 of the pilot injection amount until a time point t1. However, an actual pilot injection amount is affected by the injection amount decrease by the time deterioration of the injectors 17, and thus, the fuel is actually injected only by an injection amount Qp1, which is smaller than the optimum initial set value Qpset1. Since the actual pilot injection amount is decreased to the injection amount Qp1 from the optimum initial set value Qpset1 due to the time deterioration of the injectors 17, the sensor output signal, i.e., the rotation variation amount, has been increased to the level of a value A as shown in FIG. 6.

In the deterioration determination control of the present invention, the pilot injection is stopped during a predetermined period from the time point t1 to the time point t2. Thus, the sensor output signal, or the rotation variation amount, is further increased from the value A to a value B as shown in FIG. 6.

The engine controller 31 is configured to issue again an instruction of the pilot injection at time point t2. At this time, the engine controller 31 is configured to calculate a difference between the sensor output signals, or the rotation variation amounts, (B−A), and to compare the rotation variation amount difference with a threshold value. In this instance, the rotation variation amount difference is smaller than a threshold value. Therefore, the engine controller 31 is configured to determine that the actual pilot injection amount is insufficient despite that the engine controller 31 instructed the optimum initial set value Qpset1 of the pilot injection amount. Thus, the engine controller 31 is configured to calculate a corrected optimum set value Qpset2 by adding a correction amount to the optimum initial set value Qpset1 of the pilot injection. Therefore, the pilot injection amount is corrected by increasing the pilot injection amount from the optimum initial set value Qpset1 to the corrected optimum set value Qpset2. Here, a difference between the corrected optimum set value Qpset2 and the optimum initial set value Qpset1 is an increase correction amount. By using the increment-correction control of the initial set value, an actual pilot injection amount is increased from the injection amount Qp1 to an injection amount Qp2 that corresponds to the optimum initial set value Qpset1. As a result, the sensor output signal, or the rotation variation amount, is decreased from the value A to a value C.

Accordingly, even if as the result of the time deterioration of the injector 17, the actual pilot injection amount is decreased to be insufficient, the insufficient state of the pilot injection amount is corrected when the injection amount is reduced by the time deterioration of the injector. Accordingly, the effect of the pilot injection, or the reduction of the combustion noises and the NOx concentration, is effectively produced.

The illustrated embodiment of the present invention is applied to the engine fuel injection amount control apparatus configured to control combustion noises or exhaust gas emission to target values corresponding to the engine operation condition by adjusting an amount of fuel injected into the engine 1.

The engine controller 31 is configured to determine whether or not the combustion noise or the exhaust emission of the engine 1, which are controlled by the fuel injection amount adjusted corresponding to operation condition, changes when the fuel injection amount adjusted corresponding to operation condition is changed.

More specifically, when the injectors 17 deteriorate over time, the fuel injection amount adjusted corresponding to operation condition of the engine reduces. When the decrease of the fuel injection amount caused by the deterioration is minute, it is difficult to detect the deterioration. Therefore, the engine controller 31 is configured to determine whether or not the combustion noise or the exhaust emission of the engine 1, which are controlled by the fuel injection amount adjusted corresponding to operation condition, changes when the fuel injection amount adjusted corresponding to operation condition is changed.

Accordingly, even when the decrease of the fuel injection amount caused by the time deterioration of the injectors 17 is minute, the time deterioration of the injectors 17 can be precisely detected since the combustion noise or the exhaust emission is used which greatly changes against the minute change of the fuel injection amount.

When it is determined that a change amount of the combustion noise or the exhaust emission of the engine 1 is smaller than a predetermined value, the fuel injection amount set corresponding to engine conditions is corrected so as to provide a target combustion noise or the exhaust emission corresponding to engine operation condition.

Thus, with the present invention, the target combustion noise or the target exhaust emission can be obtained corresponding to current engine operation condition even after the injectors 17 deteriorates over time. Therefore the reliability of the engine performances is enhanced.

The present embodiment is applied to a system in which high pressure fuel stored in the common rail 16 is injected to the cylinders through the control of the current feeding to the injectors 17 connected to the common rail 16, and the main injection for controlling the engine output and the micro-injections for suppressing the combustion noise or the exhaust emission are performed by controlling the current feeding to the injectors 17 for a plurality of times during one combustion cycle of the engine 1.

In a system which controls an engine combustion noise or an exhaust emission to the target values corresponding to the engine operation condition by adjusting a minute amount of fuel injected into the engine 1 by the micro-injections, the engine controller 31 is configured to determine whether or not the combustion noise and the exhaust emission varies when the micro-injection parameter is changed when the engine is operating in a same condition.

The amount of the micro-injection, which is for suppressing the engine combustion noise and the exhaust emission when the injector 17 deteriorates by aging, is small by nature. Accordingly, it is difficult to detect decrease of the micro-injection amount. Therefore, the embodiment uses, for the determination, a change of the engine performances such as the combustion noise or the exhaust emission, which greatly changes when the micro-injection amount changes. Thus, the fuel injection control of the invention can precisely detect the decrease of the micro-injection amount, and thus, the time deterioration of the injector 17.

Advancing or retarding of the timing of the micro-injection, in place of the decreasing of the micro-injection amount, may produce the same useful effect in the present invention.

When the micro-injection is the pilot injection or the pre-injection, the engine controller 31 is configured to determine whether the actual engine combustion noise or the concentration of the NOx exhausted from the engine changes when the micro-injection parameter of the pilot injection or the pre-injection, adjusted corresponding to engine operation condition, is changed.

In the diesel engine 1, the pilot injection or the pre-injection is performed for suppressing the engine combustion noise or the concentration of the NOx exhausted from the engine. The embodiment uses, for the determination, a change of the engine combustion noise or the exhaust emission, which greatly changes when the common rail fuel injection apparatus 10 deteriorates by aging, and the amount of the pilot injection or the pre-injection decreases. Accordingly, the fuel injection control of the invention can effectively detect the time deterioration of the injectors 17.

Even after the injector 17 has deteriorated by aging, the amount of the pilot injection or the pre-injection adjusted corresponding to engine operation condition is corrected to secure the pilot injection or the pre-injection corresponding to the operation condition, whereby the combustion noise or the NOx concentration is reduced.

When the micro-injection is the after-injection, the engine controller 31 is configured to determine whether the concentration of particulate matter (PM) exhausted from the engine 1 varies when the micro-injection parameter of the after-injection adjusted corresponding to engine operation condition is changed.

In the diesel engine 1, the after-injection is performed for suppressing the concentration of particulate matter (PM) exhausted from the engine 1. The embodiment uses, for the determination, a change of the concentration of particulate matter (PM) exhausted from the engine 1, which greatly changes when the common rail fuel injection apparatus 10 deteriorates by aging, and the amount of the after-injection decreases. Accordingly, the fuel injection control of the present invention can effectively detect the time deterioration of the injectors 17.

Even after the injector 17 has deteriorated by aging, the amount of the after-injection adjusted corresponding to engine operation condition is corrected to secure the after-injection amount corresponding to the operation condition, whereby the PM concentration is reduced.

When the micro-injection is the post-injection, the engine controller 31 is configured to determine whether the concentration of the unburned HC emitted from the engine 1 changes when the micro-injection parameter of the post-injection is changed.

In the diesel engine 1, the post-injection is performed for increasing the concentration of an unburned HC emitted from the engine 1. The embodiment uses, for the determination, a change of the concentration of unburned HC exhausted from the actual engine, which greatly changes, when the common rail fuel injection apparatus deteriorates 10 by aging, and the amount of the after-injection decreases. Accordingly, the fuel injection control of the invention can effectively detect the time deterioration of the injectors 17.

Even after the injector 17 has deteriorated by aging, the amount of the post-injection adjusted corresponding to engine operation condition is corrected to secure the post-injection amount corresponding to the operation condition, whereby the unburned HC concentration is increased. Thus, even after the injector 17 has deteriorated by aging, the particulate matter deposited on the filter 41 is regenerated.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine fuel injection control method comprising:
    setting a parameter of fuel injected into an engine to a first injection parameter to control a state of at least one of combustion noise and exhaust emission of the engine to a target state when an engine operation condition is in a first operation region;
    changing the parameter of fuel injected into the engine from the first injection parameter to a second injection parameter when the engine operation condition is in the first operation region; and
    determining whether or not an actual state of the at least one of the combustion noise and the exhaust emission of the engine changes when the parameter of fuel injected into the engine is changed from the first injection parameter to the second injection parameter.

2. The engine fuel injection control method according to claim 1, further comprising
    controlling a current fed to a plurality of injectors connected to a common rail to selectively inject high pressure fuel accumulated in the common rail to a plurality of cylinders of the engine, and
    performing a main injection to control an engine output and at least one micro-injection with a minute fuel injection amount to control the state of the at least one of the combustion noise and the exhaust emission of the engine by controlling the current fed to the injectors for a plurality of times during one cycle of the engine,
    the determining includes whether or not the actual state of the at least one of the combustion noise and the exhaust emission of the engine changes when an amount of fuel injected into the engine during the at least one micro-injection is changed from a first injection amount to a second injection amount when the engine operation condition is in the first operation region.

3. The engine fuel injection control method according to claim 1, further comprising controlling a current fed to a plurality of injectors connected to a common rail to selectively inject high pressure fuel accumulated in the common rail to a plurality of cylinders of the engine, and performing a main injection to control an engine output and at least one micro-injection with a minute fuel injection amount to control the at least one of the combustion noise and the exhaust emission of the engine by controlling the current fed to the injectors for a plurality of times during one cycle of the engine, the determining includes whether or not the actual state of the at least one of the combustion noise and the exhaust emission of the engine changes when an injection timing of fuel injected into the engine during the at least one micro-injection is advanced or retarded from a first injection timing to a second injection timing when the engine operation condition is in the first operation region.

4. The engine fuel injection control method according to claim 1, further comprising correcting the first injection parameter when an amount of change of the actual state of the at least one of the combustion noise and the exhaust emission is smaller than a predetermined value when the parameter of fuel injected into the engine is changed from the first injection parameter to the second injection parameter.

5. The engine fuel injection control method according to claim 2, wherein the performing of the main injection and the at least one micro-injection includes performing at least one of a pilot injection and a pre-injection as the at least one micro-injection such that the fuel is injected in the pilot injection at a timing advanced from an injection timing of the main injection and the fuel is injected in the pre-injection at a timing immediately before the injection timing of the main injection, and the determining includes whether or not the actual state of the at least one of the combustion noise and a concentration of NOx exhausted from the engine changes when the amount of fuel injected into the engine during the at least one of the pilot injection and the pre-injection is reduced from the first injection amount to the second injection amount when the engine operation condition is in the first operation condition.

6. The engine fuel injection control method according to claim 2, wherein the performing of the main injection and the at least one micro-injection includes performing an after-injection as the at least one micro-injection in which the fuel is injected at a timing immediately after the injection timing of the main injection, and the determining includes whether or not at least one of a concentration of particulate matter exhausted from the engine and an exhaust gas temperature when the amount of fuel injected into the engine during the after-injection is reduced from the first injection amount to the second injection amount when the engine operation condition is in the first operation condition.

7. The engine fuel injection control method according to claim 2, wherein the performing of the main injection and the at least one micro-injection includes performing a post-injection as the at least one micro-injection in which the fuel is injected at a timing retarded from an injection timing of the main injection, and the determining includes whether or not a concentration of unburned HC exhausted from the engine changes when the amount of fuel injected into the engine during the post-injection is reduced from the first injection amount to the second injection amount when the engine operation condition is in the first operation condition.

8. The engine fuel injection control method according to claim 2, wherein the performing of the main injection and the at least one micro-injection includes performing at least one of a pilot injection and a pre-injection as the at least one micro-injection such that the fuel is injected in the pilot injection at a timing advanced from an injection timing of the main injection and the fuel is injected in the pre-injection at a timing immediately before the injection timing of the main injection, and the determining includes whether or not the actual state of the at least one of the combustion noise and a concentration of NOx exhausted from the engine changes when the at least one of the pilot injection and the pre-injection is stopped when the engine operation condition is in the first operation condition.

9. The engine fuel injection control method according to claim 2, wherein the performing of the main injection and the at least one micro-injection includes performing an after-injection as the at least one micro-injection in which the fuel is injected at a timing immediately after the injection timing of the main injection, and the determining includes whether or not at least one of a concentration of particulate matter exhausted from the engine and an exhaust gas temperature changes when the after-injection is stopped when the engine operation condition is in the first operation condition.

10. The engine fuel injection control method according to claim 2, wherein the performing of the main injection and the at least one micro-injection includes performing a post-injection as the at least one micro-injection in which the fuel is injected at a timing retarded from an injection timing of the main injection, and the determining includes whether or not a concentration of unburned HC exhausted from the engine changes when the post-injection is stopped when the engine operation condition is in the first operation condition.

11. An engine fuel injection control apparatus comprising:

a parameter setting section configured to set a parameter of fuel injected into an engine to a first injection parameter to control a state of at least one of combustion noise and exhaust emission of the engine to a target state when an engine operation condition is in a first operation region;

a parameter changing section configured to change the parameter of fuel injected into the engine from the first injection parameter to a second injection parameter when the engine operation condition is in the first operation region; and a determining section configured to determine whether or not an actual state of the at least one of the combustion noise and the exhaust emission of the engine changes when the parameter of fuel injected into the engine is changed by the parameter changing section from the first injection parameter to the second injection parameter.

12. The engine fuel injection control apparatus according to claim 11, further comprising
a fuel injection controlling section configured to control a current fed to a plurality of injectors connected to a common rail to selectively inject high pressure fuel accumulated in the common rail to a plurality of cylinders of the engine, and
a multi-injection control section configured to perform a main injection to control an engine output and at least one micro-injection with a minute fuel injection amount to control the state of the at least one of the combustion noise and the exhaust emission of the engine by controlling the current fed to the injectors for a plurality of times during one cycle of the engine,
the determining section is further configured to determine whether or not the actual state of the at least one of the combustion noise and the exhaust emission of the engine changes when an amount of fuel injected into the engine during the at least one micro-injection is changed from a first injection amount to a second injection amount when the engine operation condition is in the first operation region.

13. The engine fuel injection control apparatus according to claim 11, further comprising
a fuel injection controlling section configured to control a current fed to a plurality of injectors connected to a common rail to selectively inject high pressure fuel accumulated in the common rail to a plurality of cylinders of the engine, and
a multi-injection control section configured to perform a main injection to control an engine output and at least one micro-injection with a minute fuel injection amount to control the state of the at least one of the combustion noise and the exhaust emission of the engine by controlling the current fed to the injectors for a plurality of times during one cycle of the engine,
the determining section is further configured to determine whether or not the actual state of the at least one of the combustion noise and the exhaust emission of the engine changes when an injection timing of fuel injected into the engine during the at least one micro-injection is advanced or retarded from a first injection timing to a second injection timing when the engine operation condition is in the first operation region.

14. The engine fuel injection control apparatus according to claim 11, further comprising
a correcting section configured to correct the first injection parameter when an amount of change of the actual state of the at least one of the combustion noise and the exhaust emission is smaller than a predetermined value when the parameter of fuel injected into the engine is changed from the first injection parameter to the second injection parameter.

15. The engine fuel injection control apparatus according to claim 11, further comprising
an engine performance detecting section configured to detect the state of the combustion noise of the engine based on at least one of an engine vibration detected by a vibration sensor and an engine rotation variation detected by a rotation variation sensor.

16. The engine fuel injection control apparatus according to claim 11, further comprising
an engine performance detecting section configured to detect the state of the exhaust emission of the engine based on an NOx concentration in an exhaust gas detected by an NOx concentration sensor.

17. The engine fuel injection control apparatus according to clam 11, further comprising
an engine performance detecting section configured to detect the state of the exhaust emission of the engine based on a particulate matter concentration in an exhaust gas indicated by a pressure loss in a particulate filter detected by a differential pressure sensor.

18. The engine fuel injection control apparatus according to clam 11, further comprising
an engine performance detecting section configured to detect the state of the exhaust emission of the engine based on an exhaust gas temperature detected by an exhaust gas temperature sensor.

19. The engine fuel injection control apparatus according to clam 11, further comprising
an engine performance detecting section configured to detect the state of the exhaust emission of the engine based on an unburned HC concentration in an exhaust gas detected by a differential pressure sensor.

20. An engine fuel injection control apparatus comprising:
parameter setting means for setting a parameter of fuel injected into an engine to a first injection parameter to control a state of at least one of combustion noise and exhaust emission of the engine to a target state when an engine operation condition is in a first operation region;
parameter changing means for changing the parameter of fuel injected into the engine from the first injection parameter to a second injection parameter when the engine operation condition is in the first operation region; and
determining means for determining whether or not an actual state of the at least one of the combustion noise and the exhaust emission of the engine changes when the parameter of fuel injected into the engine is changed by the parameter changing means from the first injection parameter to the second injection parameter.

* * * * *